United States Patent [19]
Nagai

[11] Patent Number: 5,216,371
[45] Date of Patent: Jun. 1, 1993

[54] BATTERY PACK INCLUDING MEASURING AND INDICATING

[75] Inventor: Shinji Nagai, Atsugi, Japan

[73] Assignee: Ricoh Company, Ltd., Tokyo, Japan

[21] Appl. No.: 869,070

[22] Filed: Apr. 16, 1992

Related U.S. Application Data

[63] Continuation of Ser. No. 535,063, Jun. 8, 1990, abandoned.

[30] Foreign Application Priority Data

Jun. 12, 1989 [JP]  Japan ................................. 1-67297

[51] Int. Cl.⁵ .......................................... G01N 27/416
[52] U.S. Cl. .................................... 324/428; 324/426;
324/435; 429/90
[58] Field of Search .............................. 324/426–428,
324/433, 435, 437; 340/636; 320/48;
429/90–92, 96, 100

[56] References Cited

U.S. PATENT DOCUMENTS

| | | | |
|---|---|---|---|
| 4,181,885 | 1/1980 | Gosser et al. | 324/428 |
| 4,392,102 | 7/1983 | Sasalski et al. | 320/48 |
| 4,455,523 | 6/1984 | Koenck | 320/48 X |
| 4,762,429 | 8/1988 | Fujikawa | 340/636 X |
| 4,910,103 | 3/1990 | Yoshikawa et al. | 429/92 X |

FOREIGN PATENT DOCUMENTS 1-91260  6/1989  Japan .

Primary Examiner—Jack B. Harvey
Attorney, Agent, or Firm—Oblon, Spivak, McClelland, Maier & Neustadt

[57] ABSTRACT

A battery pack including a casing adapted to be detachably attached to a battery-powered apparatus. A rechargeable secondary battery is housed within the casing and includes positive and negative terminals. At least a pair of power electrodes are connected to the positive and negative terminals of the secondary battery and positioned on an outer surface of the casing so as to be electrically connected to the battery-powered apparatus. A measuring circuit is provided within the casing for measuring the remaining amount of electric power in the secondary battery and generating one or more information signals related to the remaining amount of the electric power which has been measured. One or more signal electrodes are provided on the outer surface of the casing and adapted to transfer the information generated from the measuring circuit to an apparatus to be connected to the battery pack. In addition to or instead of the signal electrodes, an indicating unit may be provided for indicating information related to the remaining amount of the electric power of the secondary battery at the outer surface of the casing in accordance with the information signals generated from the measuring circuit.

7 Claims, 5 Drawing Sheets

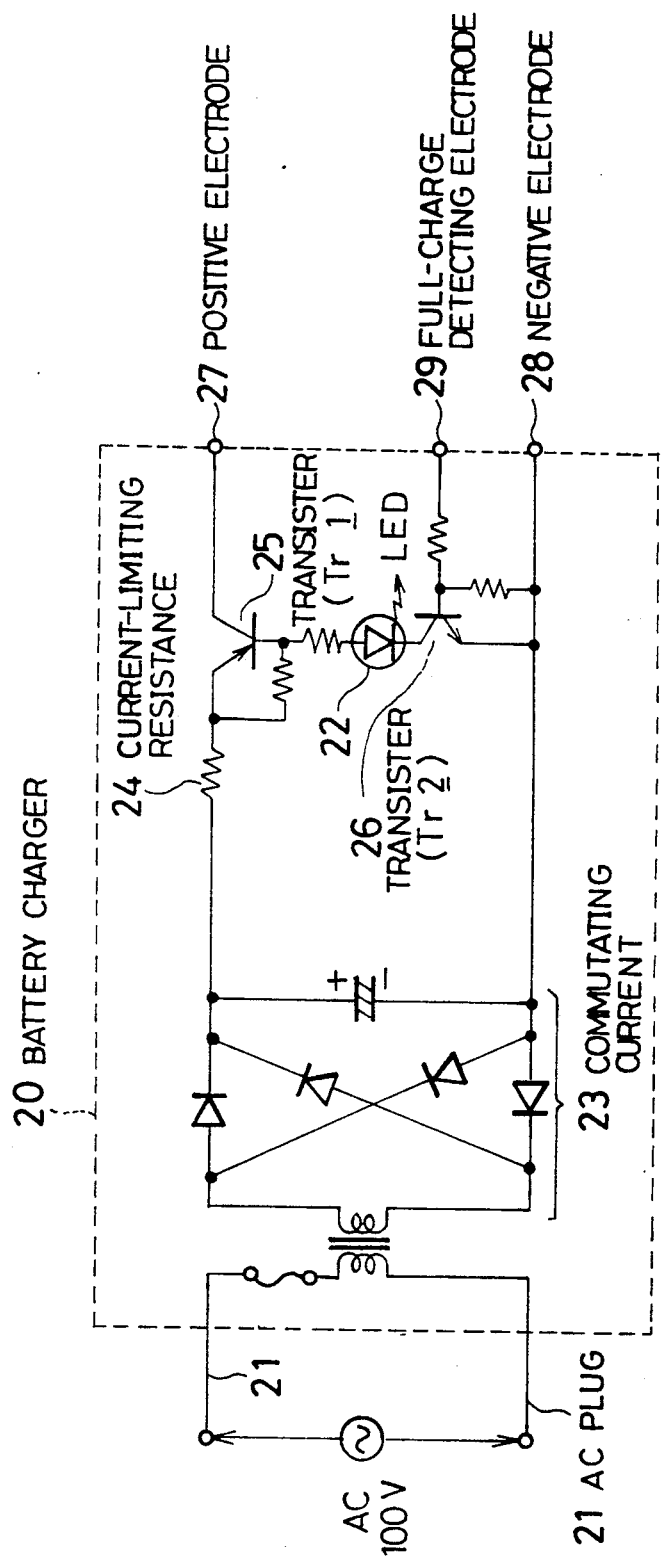

BATTERY PACK INCLUDING MEASURING AND INDICATING

This application is a continuation of application Ser. No. 07/535,063, filed on Jun. 8, 1990, now abandoned.

BACKGROUND OF THE INVENTION

The present invention relates to a battery pack for use as a drive power source for battery-powered apparatuses such as portable or laptop computer. More particularly, the invention relates to a battery pack which is equipped with a rechargeable secondary or storage battery such as Ni-Cd battery.

Recently, battery-powered electronic apparatuses using a rechargeable battery have been rapidly widely used. Especially, in the case of an electronic apparatus using a detachable battery pack equipped with a rechargeable secondary or storage battery, many users possess many battery packs in such a manner that when the electric power of a battery pack used with the electronic apparatus becomes weak due to consumption of power, the battery pack is then exchanged for another battery pack which has been fully recharged. Generally, the battery pack of this kind comprises a casing which is so constructed as to be detachably attached to the electronic apparatus body. A rechargeable storage battery having a positive and negative terminals is housed within the casing, and a pair of power electrodes connected to the positive and negative terminals of the storage battery, respectively, and disposed on an outer surface of the casing so as to be electrically connected to the apparatus body.

The above-mentioned battery pack has a disadvantage in that it is difficult for average users to confirm the remaining amount of electric power of the storage battery in the battery pack. Accordingly, accidents may occur when a battery pack which should have been fully recharged but not have been recharged in virtual due to short circuit caused by a user's mistake, trouble of a battery charger, the end of life of the battery etc., is connected to the electronic apparatus.

SUMMARY OF THE INVENTION

It is therefore an object of the present invention to provide a battery pack which uses a rechargeable secondary battery and which makes it possible to confirm the remaining amount of electric power of the secondary battery.

Another object of the invention is to provide such a battery pack which uses a rechargeable secondary battery and which can transfer information related to the remaining amount of electric power of the secondary battery to an apparatus to which the battery pack is electrically and mechanically connected.

Further object of the invention is to provide such a battery pack which uses a rechargeable secondary battery and which makes it possible to visually confirm at an outer surface thereof the remaining amount of electric power of the secondary battery.

According to one aspect of the present invention, it is provided a battery pack comprising: a casing adapted to be detachably attached to an apparatus to be electrically connected to the battery pack; a rechargeable secondary battery housed within the casing and having positive and negative terminals; at least a pair of power electrodes connected to the positive and negative terminals of the secondary battery and provided on an outer surface of the casing so as to be electrically connected to the battery-powered apparatus; means provided within the casing for measuring the remaining amount of electric power of the secondary battery and generating information signal related to the remaining amount of the electric power which has been measured; and at least one signal electrode provided on the outer surface of the casing and adapted to transfer the information signal generated from the measuring means to an apparatus to be connected to the battery pack.

In the above-mentioned battery pack, the measuring means can measure the remaining amount of electric power of the secondary battery within the casing and thus generate information signal related to the remaining amount of the electric power which has been measured. The information signal can be transferred to the apparatus such as a battery-powered apparatus through the signal electrode provided on the outer surface of the casing. Accordingly, it becomes easy to confirm the remaining amount of electric power of the secondary battery within the casing of the battery pack through the apparatus which is connected to the battery pack.

According to another aspect of the invention, the battery pack further comprises means for indicating information related to the remaining amount of the electric power of the secondary battery at the outer surface of the casing in accordance with the information signal generated from the measuring means.

In the above-mentioned battery pack, the information related to the remaining amount of the electric power of the secondary battery can be also indicated at the outer surface of the casing. Therefore, it becomes easy to visually confirm the remaining amount of electric power of the secondary battery of the battery pack, even when the battery pack is detached from the apparatus such as battery-powered apparatus.

According to further aspect of the invention, it is provided a battery pack comprising: a casing adapted to be detachably attached to a battery-powered apparatus; a rechargeable secondary battery housed within the casing and having positive and negative terminals; at least a pair of power electrodes connected to the positive and negative terminals of the secondary battery and provided on an outer surface of the casing so as to be electrically connected to the battery-powered apparatus; means provided within the casing for measuring the remaining amount of electric power in the secondary battery and generating at least one information signal related to the remaining amount of the electric power which has been measured; and means for indicating information related to the remaining amount of the electric power of the secondary battery at the outer surface of the casing in accordance with the information signal generated from the measuring means.

In the above-mentioned battery pack, the information related to the remaining amount of the electric power of the secondary battery can be indicated at the outer surface of the casing. Therefore, it becomes easy to visually confirm the remaining amount of electric power of the secondary battery of the battery pack.

Further objects, features and advantages of the present invention will become apparent from the following description of the preferred embodiments of the present invention as illustrated in the accompanying drawings.

BRIEF DESCRIPTION OF THE DRAWINGS

FIG. 7 is a diagram illustrating a construction of the battery charger shown in FIG. 2;

DETAILED DESCRIPTION OF THE INVENTION

Figure 1:
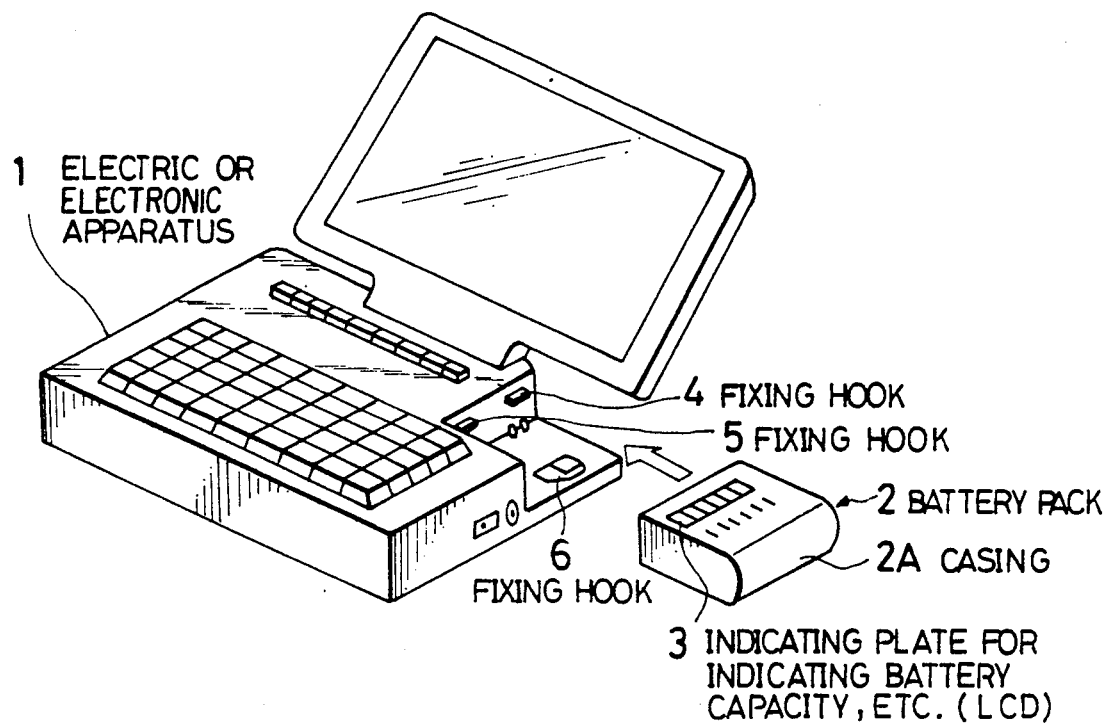
FIG. 1 is a schematical perspective view of an electronic apparatus in which a battery pack according to one embodiment of the present invention is used.
Figure 2:
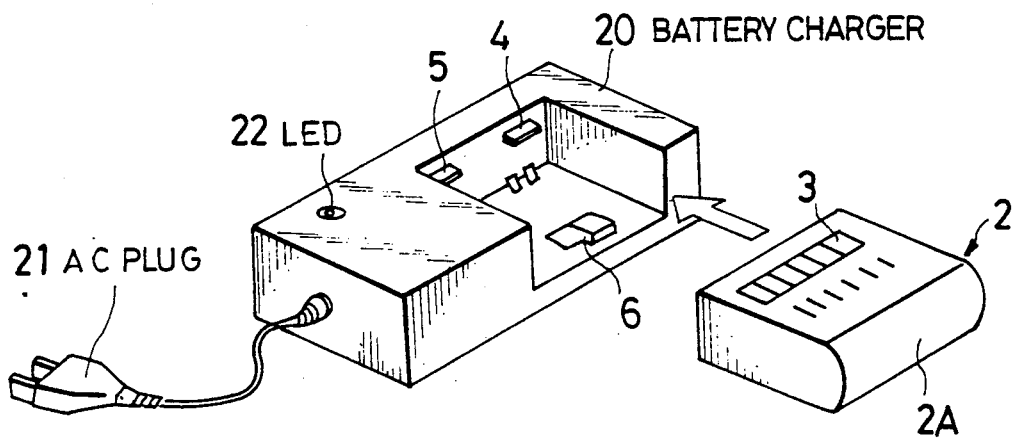
FIG. 2 is a schematical perspective view of a battery charger which is adapted to charge the battery pack shown in FIG. 1.

FIG. 1 illustrates a battery-powered laptop computer 1 as an example of an electric apparatus to which a battery pack 2 according to one embodiment of the present invention is electrically and mechanically connectable. FIG. 2 illustrates a battery charger 20 to which the battery pack 2 shown in FIG. 1 is also electrically and mechanically connectable.

Referring to FIGS. 1 and 2, the battery pack 2 comprises a casing 2A made of insulating material and which is provided at an outer surface thereof with an indicating plate 3 for indicating battery capacity, i.e., the remaining amount of electric power of a rechargeable secondary or storage battery which will be described later. In this embodiment, the indicating plate 3 is made of liquid crystal display (LCD) elements, but it is not limited thereto. In FIGS. 1 and 2, reference numerals 4, 5 and 6 denote fixing hooks or fixing the battery pack 2 to the electronic apparatus 1 or the battery charger 20. Reference numeral 21 denotes an AC plug for connecting the battery charger 20 to e.g. AC 100 V, and reference numeral 22 denotes a light emitting diode (LED) which emits light during the charging.

Figure 3:
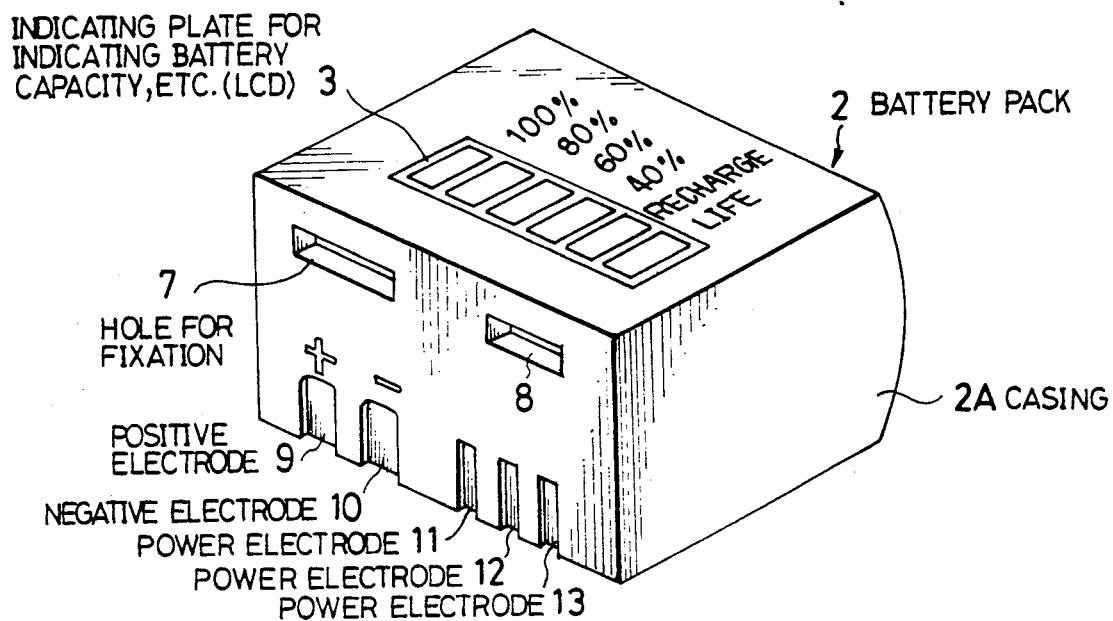
FIG. 3 is a perspective view of the battery pack shown in FIG. 1.
Figure 4:
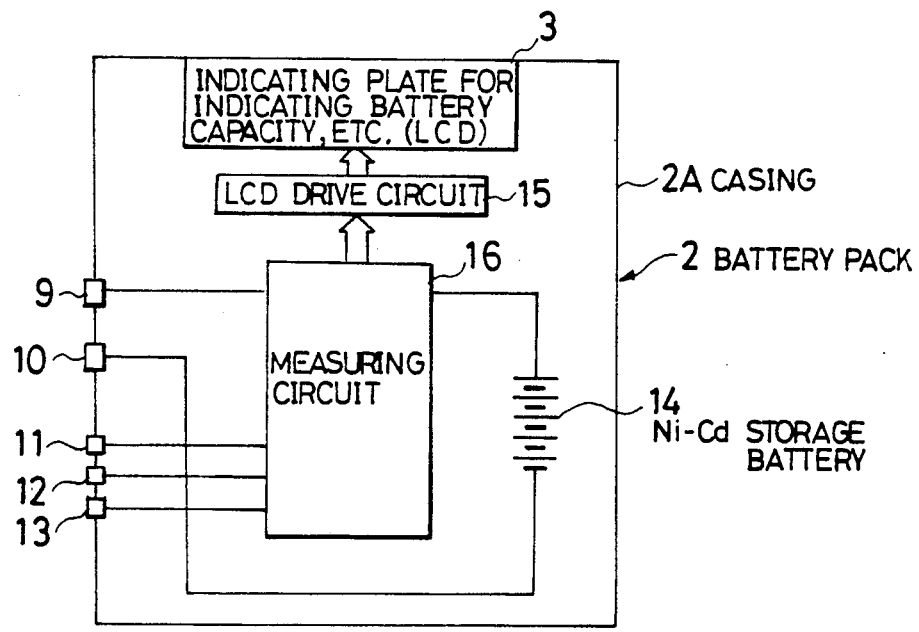
FIG. 4 is a block diagram schematically illustrating a construction of the battery pack shown in FIG. 3.

FIG. 3 illustrates an external appearance of the battery pack 2, and FIG. 4 illustrates an internal construction thereof. In FIG. 3, the casing 2A is formed with three holes (only two holes 7 and 8 are seen in FIG. 3) which are engageable with the fixing hooks 4, 5 and 6, respectively, for fixation of the battery pack 2 to the electronic apparatus 1 or the battery charger 20. In FIGS. 3 and 4, reference numeral 14 denotes the above-mentioned rechargeable secondary battery which has positive and negative terminals. In this embodiment, the secondary battery 14 is made of Nickel-Cadmium (Ni-Cd) battery, but it is not limited thereto. The positive and negative terminals of the secondary battery 14 are connected to positive and negative power electrodes 9 and 10, respectively, which are provided on the outer surface of the casing 2A and together serve to supply electric power from the secondary battery 14 to the electronic apparatus 1 or receive a charge from the battery charger 20 to the secondary battery 14. Reference numerals 11, 12 and 13 denote signal electrodes which together serve to transfer information signals generated from a measuring circuit 16 (FIG. 4) provided within the casing 2A of the battery pack 2 to the electronic apparatus 1. Reference numeral 15 denotes a LCD drive circuit for driving the LCD plate 3 in accordance with the information signals generated from the measuring circuit 16.

Explanation will now be made as to the operation of the battery pack 2 of the above-mentioned embodiment with reference to the FIGS. 3 and 4.

The measuring circuit 16 measures a battery capacity stored in the Ni-Cd storage battery 14, i.e., the remaining amount of electrical power of the battery 14, by integrating both the amount of current charged into the Ni-Cd storage battery 14 and the amount of current discharged from the Ni-Cd storage battery 14 every unit time, and the battery capacity measured thereby is indicated on the LCD plate 3. Further, in the illustrated embodiment, when the number of the recharge and discharge currents into the Ni-Cd storage battery 14 exceeds 1000 times, or when the value of a discharge capacity obtained by integrating the amount of discharge current every unit time during the term, from a state where the battery 14 is 100% recharged (i.e. fully recharged) to a state where battery is consumed becomes less than 60% of the nominal capacity value of the Ni-Cd storage battery 14, the life of the Ni-Cd storage battery 14 itself is judged to be finished, and the finish of life is indicated on the LCD plate 3.

A signal which represents that the Ni-Cd storage battery 14 is in a fully charged state can be transferred to the electronic apparatus 1 through the signal electrode 11, while another signal which represents that the Ni-Cd storage battery 14 is in a consumed state can be transferred to the electronic apparatus 1 through the signal electrode 12, and further signal which represents that the Ni-Cd storage battery 14 is in a life-finished state can be transferred to the electronic apparatus 1 through the signal electrode 13.

On the other hand, when the battery pack 2 is recharged by a battery charger 20 up to a fully charged state, the signal which represents a fully charged state is transferred to the battery charger 20 through the signal electrode 11. In response to this signal, the battery charger stops charging to the battery pack 2.

Figure 5:
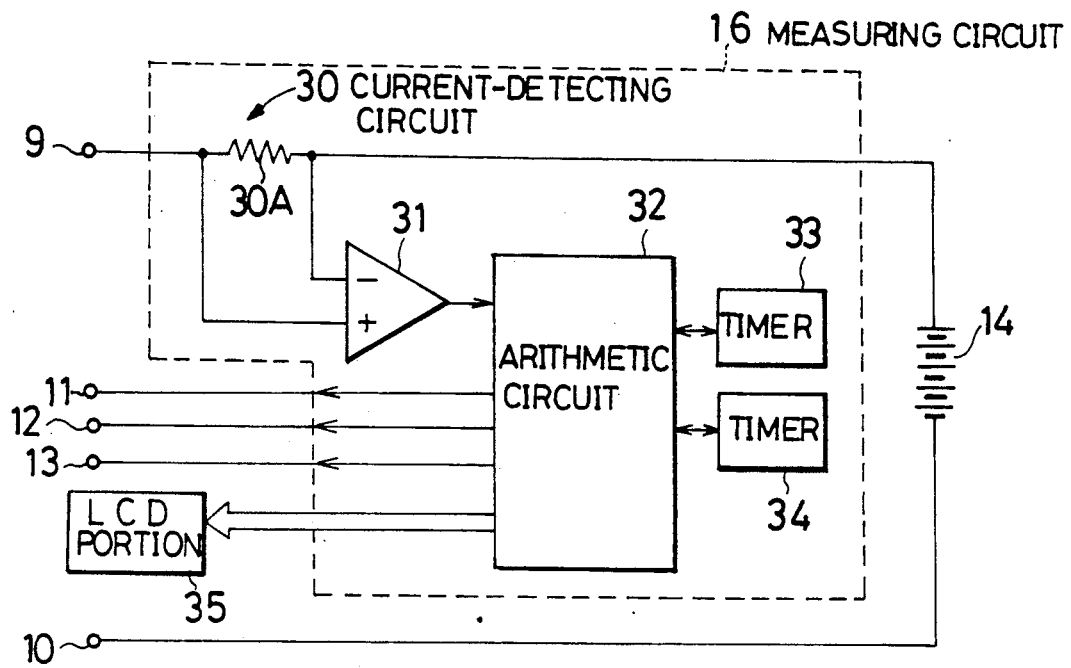
FIG. 5 is a block diagram for explaining a construction of a measuring circuit shown in FIG. 4, including a current-detecting circuit.

FIG. 5 illustrates a construction of a measuring circuit of the battery pack 2. The terminals 9 to 13 shown in FIG. 5 are the same as those shown in FIGS. 3 and 4, respectively. In FIG. 5, reference numeral 14 denotes a Ni-Cd storage battery, and reference numeral 16 denotes a measuring circuit which comprises a current detecting circuit 30 for detecting the value of recharge current or discharge current, an amplifier 31 for the amplification of the output signal of the current-detecting circuit 30, an arithmetic circuit 32 for integrating the value of current every unit time, etc., a timer 33 for generating a signal for defining the unit time for the integrating operation, and a random-access memory (RAM) 34 for holding integrated data, etc. Reference numeral 35 denotes a LCD portion which consists of a LCD drive circuit 15 and a LCD plate 3. In this embodiment, the current detecting circuit 30 is constituted of a current-detecting resistor 30A which is connected between the positive power electrode 9 and the positive terminal of the Ni-Cd battery 14. The input terminals of the amplifier 31 are connected to the opposite ends of the current-detecting resistor 30A, respectively. Accordingly, potential difference between the resistor 30 can be measured to obtain the value of current which flows the resistor 30A.

Figure 6A:
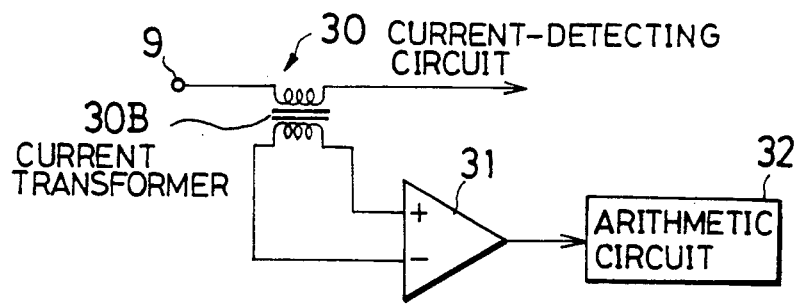
FIGS. 6(a) and (b) are views for explaining alternative arrangements of the current-detecting circuit, respectively.
Figure 6B:
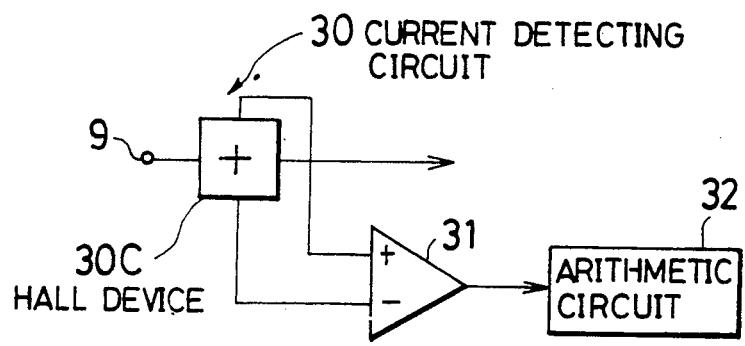

The method for detecting current value by using the current-detecting resistor 30A, may be substituted for a method for detecting an electromotive force generated at the secondary side by current which flows the primary side by using a current transformer 30B as shown in FIG. 6(a), or a method which uses a hall device 30C as shown in FIG. 6(b) for detecting an electromotive force generated by a current which flow the hall device 30C and a magnetic field generated from the hall device 30C.

FIG. 7 illustrates a circuit construction of the battery charger 20 shown in FIG. 2. In FIG. 7, the battery charger 20 comprises an AC plug 21, a LED 22 which emits light during charging, a commutating circuit 23 consisting of bridge-arranged diodes and a smoothing capacitor, a current-limiting resistance 24 and transistors (Tr1) 25 and (Tr2) 26 for performing ON/OFF switch of charging. Further, for the connection with the battery pack 2, positive and negative power electrodes 27 and 28, and a fully charged state detecting electrode 29 for sensing a state in that the secondary battery is fully charged are provided on the battery charger 20 opposite to the positive and negative power electrodes 9 and 10, and the signal electrode 11 of the battery pack 2 shown in FIG. 3, respectively.

The operation of the battery charger 20 is such that when the battery pack 2 is connected to the battery charger 20, the Ni-Cd storage battery 14 is charged at the value of current limited by the current limiting resistance 24; when the Ni-Cd storage battery 14 is fully charged, a signal from the electrode 11 of the battery pack 2 becomes high level, i.e., the electrode 29 becomes high level, whereby the transistors 26 (Tr2) and (Tr1) being switched OFF and the LED 22 being extinguished and then, charging is stopped.

Figure 8:
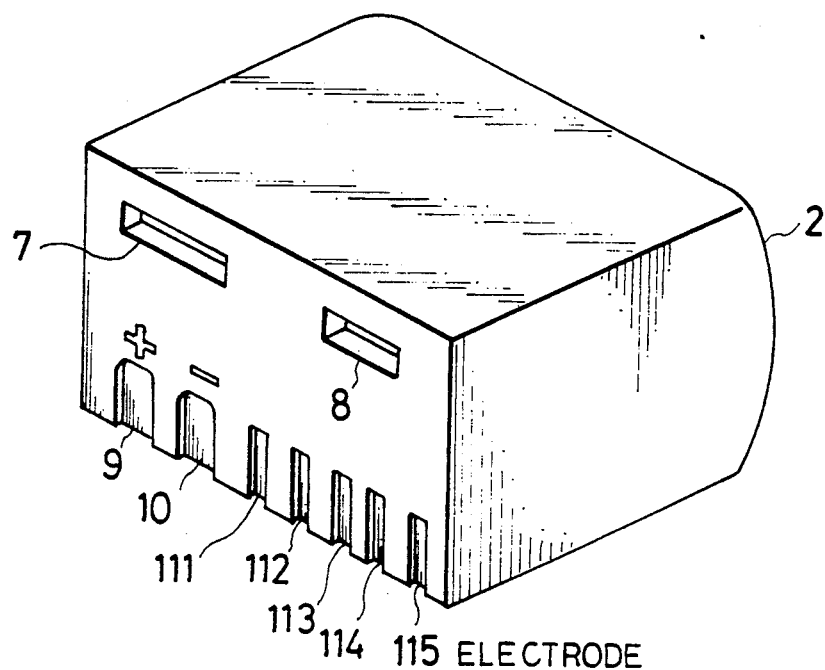
FIG. 8 is a perspective view illustrating another embodiment of the present invention.

FIG. 8 illustrates a battery pack according to another embodiment of the present invention. In FIG. 8, the constituent elements represented by reference numerals 2, 7, 8, 9 and 10 are the same as those shown in FIG. 3. Signal electrodes 111, 112, 113, 114 and 115 are adapted to transfer information signals related to various stages of the battery capacity, battery life-finished state, etc. to an electronic apparatus to be connected. In this embodiment, the indication of battery capacity is not performed on the battery pack 2, but it will be performed on the side of the electronic apparatus to be connected.

Figure 9:
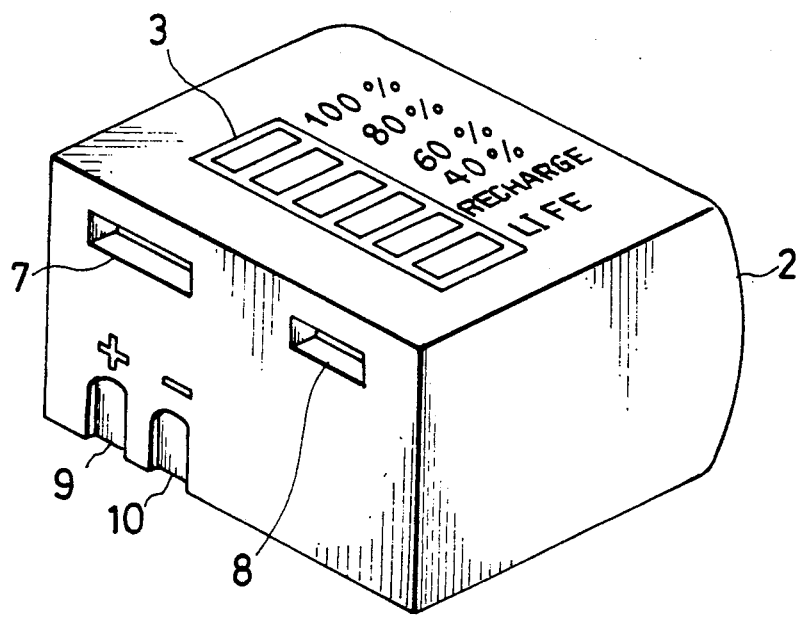
FIG. 9 is a perspective view illustrating further embodiment of the present invention.

FIG. 9 illustrates a battery pack according to still another embodiment of the present invention. In FIG. 9, the constituent elements represented by reference numerals 2, 3, 7, 8, 9 and 10 are the same as those shown in FIG. 3, respectively. In this embodiment, the indication of the battery capacity is made only on the battery pack 2, so signal electrodes as in the foregoing embodiments can be eliminated, and thus the construction of the battery pack can be simplified.

Even by using the methods shown in FIGS. 8 and 9, the similar or approximate effects can be obtained.

As apparent from the above description of the embodiments, the battery pack according to the present invention has at least one of the following advantages.

(1) The state of battery (e.g., battery capacity, life of battery, etc.) in the battery pack can be visually confirmed.

(2) By the arrangement that the state of the battery in the battery pack can be transferred to the electronic apparatus to be connected thereto, appropriate treatment to the objective matters can be made at the side of the apparatus.

(3) Easy maintenance of the battery pack can be made even though a plurality of battery packs having the same shape are possessed by a user.

While the invention has been described in conjunction with specific embodiments thereof, it is evident that many alternatives and modifications will be apparent to those skilled in the art in light of the foregoing description. For example, the battery pack may include only one signal electrode which can transfer the information signal related to the remaining amount of electric power of the secondary battery. Accordingly, it is intended to include all such alternatives and modifications as fall within the spirit and scope of the appended claims.

What is claimed is:

1. A battery pack comprising:
   a casing adapted to be detachably attached to a battery-powered apparatus;
   a rechargeable secondary battery housed within the casing and having positive and negative terminals;
   only one pair of power electrodes connected respectively to the positive and negative terminals of the secondary battery and positioned on an outer surface of the casing so as to be electrically connected to the battery-powered apparatus, said electrodes being used both as recharge electrodes and discharge electrodes;
   a measuring means provided within the casing for measuring the remaining amount of electric power of the secondary battery and generating at least one information signal related to the remaining amount of the electric power which has been measured;
   at least one signal electrode provided on the outer surface of the casing and adapted to transfer the information signal generated from the measuring means to an apparatus to be connected to the battery pack; and
   an indicating means provided on the outer surface of the casing for indicating information related to the remaining amount of the electric power of the secondary battery in accordance with the information signal generated from the measuring means.

2. A battery pack according to claim 1, wherein the measuring means comprises:
   a current detecting circuit which detects the value of recharge current and discharge current under operational load and generates an output signal;
   an amplifier adapted to receive the output signal of the current-detecting circuit and amplify the output signal;
   a timer for generating a signal for defining a unit time;
   an arithmetic circuit adapted to receive the output signal of the amplifier and integrate the value of the output signal every unit time generated by said timer so as to obtain the remaining amount of electric power of the secondary battery; and
   a random-access memory for holding integrated data.

3. A battery pack according to claim 2, wherein the arithmetic circuit is also adapted to integrate the value of the output signal every unit time so as to decide whether the life of the secondary battery is finished.

4. A battery pack according to claim 2 or 3, wherein the arithmetic circuit is also adapted to count the number of a repetitions of recharging and discharging the secondary battery and to decide whether the number of repetitions exceeds a predetermined number which corresponds to a state at which the life of the secondary battery is finished.

5. A battery pack according to claim 1, wherein the indicating means comprises:
 a display member provided on the outer surface of the casing; and
 a drive circuit connected between the measuring means and the display member within the casing and adapted to drive the display member for the indication of the information related to the remaining amount of electric power of the secondary battery at the display means in accordance with the information signal generated from the measuring means.

6. A battery pack according to claim 5, wherein the indicating means is adapted to indicate different stages of remaining amount of electric power of the secondary battery and the life of the secondary battery being finished in accordance with the information signal generated from the measuring means.

7. A battery pack according to claim 5, wherein the display member comprises liquid crystal display elements.

* * * * *